C. E. KELLS.
WATER DISTILLING APPARATUS.
APPLICATION FILED JULY 26, 1920.
1,379,631.
Patented May 31, 1921.
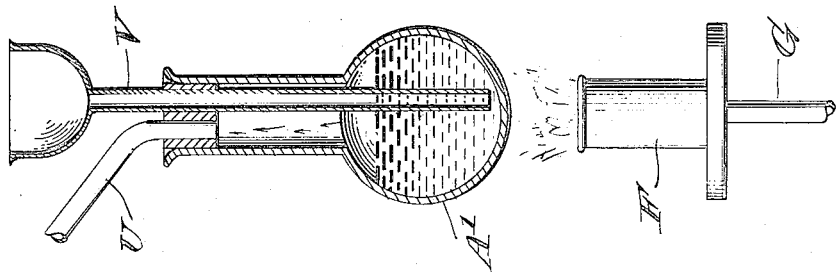
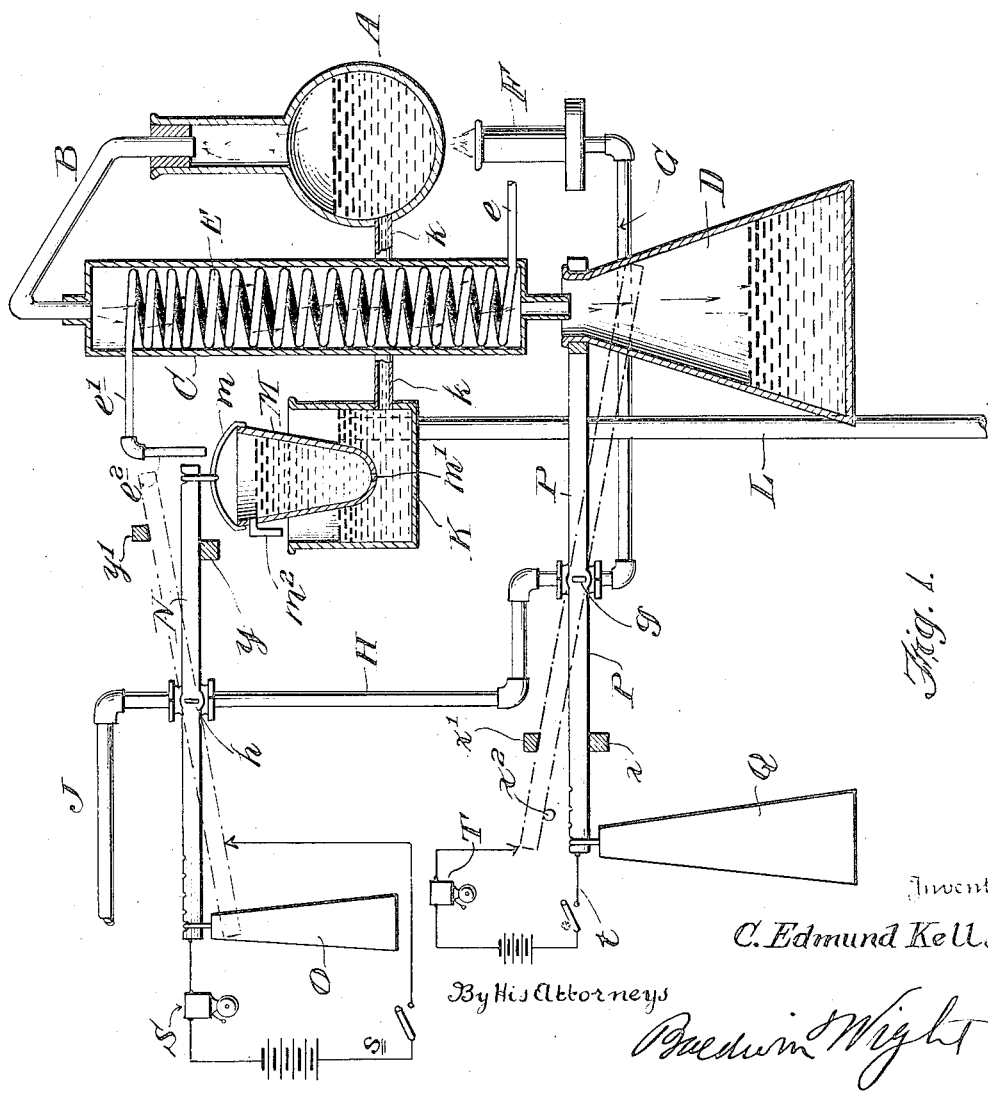
Inventor
C. Edmund Kells
By His Attorneys

UNITED STATES PATENT OFFICE.

CHARLES EDMUND KELLS, OF NEW ORLEANS, LOUISIANA.

WATER-DISTILLING APPARATUS.

1,379,631.      Specification of Letters Patent.      Patented May 31, 1921.

Application filed July 26, 1920. Serial No. 398,859.

*To all whom it may concern:*

Be it known that I, CHARLES EDMUND KELLS, a citizen of the United States, residing at New Orleans, in the parish of Orleans and State of Louisiana, have invented certain new and useful Improvements in Water-Distilling Apparatus, of which the following is a specification.

This invention relates to apparatus for distilling water, particularly for the use of physicians, surgeons and dentists who generally require small quantities of freshly distilled water from day to day or for constant use.

It is important that water for such purpose should be distilled in apparatus consisting largely of glass in preference to metal, as the distilled water is often used for injections and absolute purity is essential. Therefore, it is important that the water, while being distilled, and after distillation, should not come in contact with metal. Stills of the general class to which my invention relates, as commonly constructed require constant watching in order that the water supply shall not fail because otherwise the glass flask, when such is employed, will be cracked, burned, or broken by the heat of the burner.

According to my invention, I provide a distilling apparatus in which the parts above specified are constructed of glass and which is automatic in the control of the water supply and the heating medium, so that the proper amount of water is constantly provided for normally keeping the water in the flask at the proper level, and the proper amount of heating medium admitted to the burner to carry on the operation, the apparatus being so constructed that should the water supply fail or become insufficient the fuel supply will be at once automatically cut off so that breakage of any part of the apparatus from overheating is prevented.

It is also desirable that the distilled water should not be wasted, and I have therefore provided means for automatically cutting off the fuel supply and thus suspending the distilling operation when the desired amount of distilled water is obtained.

The apparatus being automatic in suspending the distilling operation when the water supply fails or when the desired amount of distilled water is obtained, it is desirable that when the operation is suspended the user of the apparatus should be notified in order that he may obtain the supply of distilled water and may again start the apparatus. I have therefore provided signaling devices for giving such notice.

In the accompanying drawings:

Figure 1 shows diagrammatically and mainly in section distilling apparatus embodying my improvements.

Fig. 2 illustrates a modification.

A flask or still A is connected by a pipe B with a condenser C. The condenser delivers to a receiver D for distilled water and contains a coil E. These parts A, B, C, and D are preferably made of glass for sanitary purposes, as above explained.

Water enters the coil E through the pipe $e$ which may be connected to a tank or to a service pipe. After passing through the coil the water leaves the condenser at $e'$. The coil is also preferably made of glass.

The burner F is supplied with fuel by a pipe G having a valve $g$ and the pipe G connects with another pipe H having a valve $h$, through which fuel passes from the pipe J.

A tank K is connected with the flask A by a horizontally arranged pipe $k$ and an overflow pipe L extends from the tank to a sink or other suitable receiver. A water vessel M, which is supplied by a branch $e^2$ of the pipe $e'$, extends into the tank and is supported by a lever N connected with the valve $h$. This lever extends beyond the valve and carries an adjustable weight O. A stop $y$ limits the downward movement of that end of the lever which carries the vessel M and a stop $y'$ limits the upward movement of this end of the lever. The vessel is open at the top, being connected to the lever by a bail $m$ and it has an opening $m'$ in its bottom through which water, received from the coil E, is slowly delivered to the tank below it. The vessel M is provided with an overflow pipe $m^2$ delivering to the tank K.

The receiver D is removably supported by one arm of a lever P connected with the valve $g$ and carrying on its opposite end an adjustable weight Q. The downward movement of the weight-carrying end of the lever is limited by a stop $x$ and the upward movement of this end of the lever is limited by a stop $x'$.

Water supplied through the pipe $e$ passes through the coil E, thence out through the pipe $e'$ and down through the branch $e^2$ to the vessel M from which it passes through the hole $m'$ to the tank K and thence through the pipe $k$ to the flask A.

The arrangement is such that the coil is cooled by the water passing through it and the water, partially warmed, passes to the vessel M, thence to the tank and thence to the flask. The adjustments are such that the weight O on the lever N counterbalances a predetermined amount of liquid in the vessel M. A constant level is maintained in the tank and a corresponding level in the flask. Should the water supply fail or unduly decrease, the lever N will be lowered at its weighted end and the fuel supply will be shut off, thus stopping the distilling operation. When this occurs, an electric circuit $s$ is closed, operating a signaling device S so that the attendant, being thus notified may give proper attention to the apparatus to again start the supply of water. The water level in the tank K and the flask A cannot rise above the level indicated, this being prevented by the overflow pipe L.

The receiver D, as before explained, is removably supported on the lever P. When the weight of water in the receiver has reached the predetermined degree or when the liquid level desired has reached a known height, it overbalances the weight Q and the lever is turned, thus closing the valve $g$ and shutting off the fuel supply. When the receiver thus drops and the fuel supply is shut off a signal may be given by means of the electric circuit $t$ and the signaling device T.

When the receiver is removed from the lever P the weight Q will tend to so move the lever as to turn on the fuel supply. This may be prevented by placing a pin or plug in the hole $x^2$ beneath the lever when its weight-carrying end is raised.

The apparatus may be used in various ways, but preferably in starting the vessel M may be filled with water, the hole $m$ being closed and the weight O adjusted to balance the filled receiver, the downward movement of the vessel-carrying end of the lever N being limited by the stop $y$. After this the water to be distilled may be allowed to fill the tank K to the level shown and correspondingly fill the flask.

The receiver D is filled to a predetermined level. The receiver thus filled is attached to the lever P and the weight Q is properly adjusted so that the filled receiver just overbalances the weight. The receiver is then emptied and is hung on its support, the downward movement of the weighted end of the lever being limited by the stop $x$.

When the apparatus is thus adjusted both valves $g$ and $h$ will be open and the supply of fuel to the burner will be continuous and the supply of water to the still will be also continuous.

If the water supply fails or is unduly decreased so that the water distils faster than it is supplied, the liquid level in the vessel M will fall, consequently the weight of water decreases and the weight O causes the lever to turn and shut off the fuel supply, thus stopping the distillation and operating the signal S.

When the receiver D is filled to the proper extent and overbalances the weight Q the fuel supply is shut off at $g$ and the distilling operation is suspended. At the same time the signal T is operated. The receiver D may be detached from the lever and another receiver put in its place or after the receiver D is emptied it may be again connected with said lever.

When the receiver D is withdrawn from the lever P the receiver-carrying end of the lever rises but the downward movement of the opposite end of the lever is arrested by the stop $x$.

In order to prevent the turning on of the fuel supply, a plug may be inserted at $x^2$ beneath the weighted end of the lever to hold it in such manner as to prevent the valve $g$ from being turned to open position.

In Fig. 2 I have shown a simple form of apparatus, embodying some of my improvements. In this case, water is not automatically supplied to the flask A' but is poured into the flask through a tube V resembling a thistle tube. The tube U is adapted to connect with a condenser such as the condenser before described. The condenser may deliver to a receiver D supported by a counterbalanced lever, operating the valve of a fuel supply, as before explained. It will thus be seen that the modified form of apparatus is similar to that before described except that the means for automatically supplying water to the still is omitted.

In operating the modified form of the apparatus, assuming that the flask A' contains two parts of water and that the receiver D is adjusted to overbalance the counterweight at three pints, when water has been distilled to the extent of three pints the receiver overbalances the weight Q and turns off the fuel supply and the distilling operation ceases, as before explained. One pint of water still remains in the flask A' which is a large margin of safety. The flask may of course hold any desired amount and the receiver may be of proper size to correspond with the size of the flask and may be balanced in the manner before described.

In my copending application for patent No. 313,481 filed July 26, 1919 I have shown water distilling apparatus similar in many respects to that herein shown and described. The claims of my present application relate to certain modifications of and improvements on the apparatus claimed in my before-mentioned application.

I claim as my invention:—

1. A distilling apparatus, comprising a still, a burner for heating it, means for supplying fuel to the burner, a condenser connected with the still, a receiver for distilled water, means for automatically cutting off the fuel supply when the desired amount of distilled water is obtained, and means for actuating a signal when the fuel supply is thus stopped.

2. A distilling apparatus, comprising a still, a burner for heating it, a condenser connected with the still, means for supplying fuel to the burner, a receiver for the distilled water, means for supplying water to the still, means for automatically cutting off the fuel supply when the water supply fails or is unduly diminished, and means for actuating a signal when the fuel supply is thus stopped.

3. A distilling apparatus, comprising a still, a burner for heating it, a condenser for the products of distillation, a receiver for the condensed water, a tank connected with the still and supplying water thereto, a counterbalanced vessel receiving water from a supply and delivering to the tank, and means connected with and operated by said vessel for shutting off the fuel supply when the water supply fails or is unduly diminished.

4. A distilling apparatus, comprising a still, a burner for heating it, a condenser for the products of distillation, a tank connected with the still and supplying water thereto, a counterbalanced vessel receiving water from the condenser and delivering to the tank, and means connected with an operated by said vessel for shutting off the fuel supply when the water supply fails or is unduly diminished.

5. A distilling apparatus, comprising a still, a burner for heating it, a condenser for the products of distillation, a tank connected with the still and supplying water thereto, a vessel receiving water from a water supply and delivering to the still, an overflow for said vessel, an overflow for the tank, a counterbalanced lever to which the water-receiving vessel is connected, a pipe supplying fuel to the burner, and a valve in said pipe operated by said counterbalanced lever to shut off the fuel supply when the water supply fails or is unduly diminished.

6. A distilling apparatus, comprising a still, a burner for heating it, a condenser for the products of distillation, a pipe supplying fuel to the burner, a valve therein, a lever for operating said valve, a receiver for condensed water suspended from said lever, and a counterbalancing weight carried by the lever.

In testimony whereof, I have hereunto subscribed by name.

CHARLES EDMUND KELLS.